United States Patent Office 2,949,407
Patented Aug. 16, 1960

2,949,407

METHOD FOR PREPARING TETRACYCLINE III

Masao Arishima, Nakano-ku, and Yasuharu Sekizawa, Shibuya-ku, Tokyo, Japan, assignors to American Cyanamid Company, New York, N.Y., a corporation of Maine No Drawing. Filed June 4, 1956, Ser. No. 589,005

3 Claims. (Cl. 195—80)

This invention relates to the manufacture of tetracycline and more particularly to the production of tetracycline by microorganisms which also tend to form chlortetracycline in fermentation media containing chlorides.

Recently it has been discovered that microorganisms of the genus Streptomyces which produce chlortetracycline will also produce tetracycline, particularly if the chloride ion concentration of the fermentation medium is kept low. This can be done by providing fermentation media from which chloride ions are excluded, either by making up the fermentation medium with chloride-free components or by treating the medium with agents which remove or sequester the chloride ions, thus making them unavailable for the formation of chlortetracycline.

Unfortunately some of the most effective components of fermentation media for the production of the tetracycline antibiotics contain substantial quantities of chloride ions. Corn steep liquor is one of the most effective nutrient substances for the production of the tetracycline antibiotics as well as many other antibiotics. Apparently, this natural material contains something that is especially desired by the fermenting microorganism. Highest yields of antibiotic are, therefore, obtained when a portion of corn steep liquor is included in the aqueous nutrient medium. Corn steep liquor contains substantial amounts of chloride ions, however, and if formation of chlortetracycline is to be kept at reasonably low levels, it has heretofore been considered necessary to reduce the chloride content of this material. The same applies to a number of other naturally occurring nutrient materials which are advantageously used in the fermentation process.

Several means of reducing the chloride ion content of aqueous nutrient solutions for tetracycline production have been suggested. Precipitation of the chloride ion as silver chloride is a very effective means of reducing the chloride ion content. However, this is an expensive process requiring the use of expensive raw materials, special equipment, and a toxic gas, hydrogen sulfide, for recovery of silver.

Ion exchange resins have also been suggested to reduce the chloride ion content of fermentation media. These substances tend to remove some salts and organic substances of unidentified composition which are desirable components of the fermentation media. As a result, low yields of antibiotic may be obtained when using nutrient solutions which have been pre-treated with ion exchange resins to remove chloride ions.

The chloride deprivation systems still leave much to be desired, however, because of the capital investment required, the relatively complicated means of removing chloride ions from the fermentation medium, as well as the fact that the fermentation medium can in such instances be composed only of those raw materials from which chloride ions can be easily removed or which are naturally low in chlorides.

It has also been proposed to shift the equilibrium in a tetracycline-chlortetracycline fermentation by the use of bromide ions which apparently represses chlortetracycline formation in some respects.

The present invention depends for its effectiveness in producing high yields of tetracycline in a fermentation medium in which it is not necessary to remove chloride ions from the system. The present invention is based upon the discovery that when a chlorination inhibitor as hereinafter described is added to a chloride containing fermentation, the activities of the organism are directed from the synthesis of chlortetracycline to the synthesis of tetracycline. The invention is of extreme practical importance because it obviates the expense and disadvantages of removing chloride ions from the fermentation medium. Thus, in accordance with the present invention a chloride-containing, chlortetracycline fermentation can be easily converted to a tetracycline fermentation by the addition to the nutrient medium of relatively small amount of a chlorination inhibitor as hereinafter described.

The present invention is not particularly concerned with any specific microorganisms except to the extent that it is concerned with those that produce both chlortetracycline and tetracycline by fermentative bio-synthesis. Insofar as we are presently aware all such microorganisms are of the genus Streptomyces. The species *Streptomyces aureofaciens*, first isolated and described by Dr. Duggar, U.S. Patent 2,482,055, produces chlortetracycline in fermentation media in which chloride ions are present. This species, and its numerous natural and induced mutants, will also produce tetracycline when deprived of chloride ions. A number of other tetracycline producing microorganisms have been mentioned in the patent literature as alleged distinct species and among these may be mentioned *S. viridifaciens*, *S. sayamaensis*, *S. feofaciens*, BL 567201, and still others. The published morphological data on these microorganisms is insufficient to conclusively determine whether or not they are new species or merely strains of *S. aureofaciens*. Regardless of this, however, the invention is not predicated upon the selection of a particular species but, as indicated above, of controlling and reducing the proportion of chlortetracycline that is produced by these microorganisms in fermentation media containing chloride ions.

The conditions of the fermentation are generally the same as for presently known methods of producing tetracycline or chlortetracycline by fermentation. That is, the fermentation medium contains the usual nutrients and mineral substances. Suitable nutrient substances which may provide those necessary substances include starch, dextrose, cane sugar, glucose, molasses, soybean meal, peanut meal, yeast, meat extracts, peptone, ammonium sulfate, urea, corn steep liquor, distillers solubles, fish meal and other conventional substances. The inorganic salts include such things as calcium carbonate, ammonium sulfate, ammonium chloride, sodium dihydrogen phosphate, and the various trace elements such as manganese, cobalt, zinc, copper, iron, and the like.

The other general conditions of the fermentation, such as hydrogen ion concentration, temperature, time, rate of aeration, preparation of the inoculum, sterilization, inoculation and the like are conventional and may be similar to those shown in the U.S. patent to Duggar, 2,482,055, and other subsequent patents which describe the production of chlortetracycline and tetracycline.

Similarly, the recovery of the tetracycline from the fermentation liquor is conventional and need not be described, as numerous methods of recovering tetracycline from fermentation liquors have been published.

The substance of the present invention which when added to the fermentation medium inhibits the formation of chlortetracycline and permits the increased production of tetracycline in a chloride containing medium is called thionalide, also known as alpha mercapto-N-2-napthyl-acetamide. Very small amounts of this substance, as little as five parts per million, depress the formation of chlortetracycline and larger amounts have a more profound effect so that when using 1,000 parts per million of thionalide approximately 99% of the total antibiotic content of the fermentation medium at the end of the fermentation is tetracycline.

The use of thionalide is particularly advantageous in conjunction with bromide ions which have previously been shown to reduce the production of chlortetracycline. By using thionalide and bromide ions together it is possible to obtain a very high percentage of tetracycline in the fermentation liquor with much smaller quantities of either thionalide or bromide ion than would normally be necessary. Accordingly, we prefer to use thionalide in the amounts named above with from about 0.005% to about 2.0% of bromide ion which may be supplied to the fermentation medium by adding a water soluble bromide salt such as potassium or sodium bromide.

EXAMPLE 1

A fermentation medium composed of the following substances was prepared:

| | Percent |
|---|---|
| Starch | 2.8 |
| Molasses | 0.2 |
| Powdered peanuts | 3.0 |
| Dry yeast | 0.5 |
| $CaCO_3$ | 0.4 |
| $MnSO_4.7H_2O$ | 0.0007 |
| $ZnSO_4.7H_2O$ | 0.003 |

To portions of this medium were added varying amounts of thionalide (alpha mercapto-N-2-napthylacetamide) in one series and to a similar series there was added in addition 0.35% NaBr. Fifty ml. of the culture media were put into culture flasks (500 ml. capacity) and sterilized by heating at 120° C for five minutes under increased pressure. After cooling the medium in each flask was inoculated with 1 ml. of a seed culture of *Streptomyces sayamaensis*, and subjected to aerobic fermentation with shaking (frequency, 146 per min.; amplitude, 10 cm.) for 72 hours. After this time the culture broth in each flask is at pH 6.3–7.8 and shows maximum antibiotic activity. The tetracycline produced therein is then determined with the following results:

Table 1

| Compound | Addition level, p.p.m. | NaBr, percent | Total Tetracycline, gamma/ml. | Percent Tetracycline |
|---|---|---|---|---|
| Control | 0 | 0 | 3,200 | 15 |
| Thionalide | 100 | 0 | 1,420 | 80 |
| Do | 500 | 0 | 690 | 90 |
| Do | 1,000 | 0 | 400 | 99 |
| Control | 0 | 0.35 | 2,850 | 80 |
| Thionalide | 30 | 0.35 | 1,340 | 99 |

We claim:
1. A method of producing tetracycline which comprises the step of aerobically fermenting an aqueous medium with microorganisms of the Streptomyces genus which tend to produce chlortetracycline in a chloride containing medium said medium containing a small amount of thionalide effective in reducing the production of chlortetracycline.
2. A method of producing tetracycline with strains of *S. aureofaciens* which produce chlortetracycline in a chloride containing fermentation medium the improvement which comprises the step of adding to said chloride containing medium from about 5 to 1,000 parts per million of thionalide.
3. A process in accordance with claim 2 in which the nutrient medium also contains from about 0.005 to 2.0% by weight of bromide ions.

References Cited in the file of this patent
UNITED STATES PATENTS

| 2,712,517 | Gourevitch et al. | July 5, 1955 |
| 2,734,018 | Minieri | Feb. 7, 1956 |
| 2,739,924 | Lein et al. | Mar. 27, 1956 |
| 2,763,591 | Hatch et al. | Sept. 18, 1956 |

FOREIGN PATENTS

| 316,291 | Switzerland | Nov. 15, 1956 |

OTHER REFERENCES

Martell et al.: Chemistry of the Metal Chelate Compounds, pp. 471, 557, 558, 532, 134–1, Prentice-Hall, Inc., 1952.

Gourevitch et al.: Antibiotics and Chemotherapy, vol. V, No. 8, August 1955, pp. 448–452.

Sekizawa: Jour. of Biochemistry, vol. 42, No. 2, pp. 217–219.

N. Y. Acad. Sci., vol. 60, Art. 1, pp. 71–101.